(12) United States Patent
Strashny et al.

(10) Patent No.: US 12,522,109 B2
(45) Date of Patent: Jan. 13, 2026

(54) PROCESS AND SYSTEM FOR POLE AND CONDUCTOR INSTALLATION FOR CHARGING WHILE MOVING

(71) Applicant: Caterpillar Inc., Peoria, IL (US)

(72) Inventors: Igor M. Strashny, Tucson, AZ (US); Roopa Rajesh, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 709 days.

(21) Appl. No.: 17/985,024

(22) Filed: Nov. 10, 2022

(65) Prior Publication Data

US 2024/0157851 A1  May 16, 2024

(51) Int. Cl.
*B60M 1/08* (2006.01)
*B60L 5/00* (2006.01)
(Continued)

(52) U.S. Cl.
CPC .............. *B60M 1/08* (2013.01); *B60L 5/00* (2013.01); *B60L 5/38* (2013.01); *B60L 5/39* (2013.01);
(Continued)

(58) Field of Classification Search
CPC . B60M 1/08; B60M 1/30; B60M 1/28; B60M 7/00; B60L 2200/40; B60L 2200/36; B60L 53/32; B60L 50/53; B60L 5/00; B60L 5/08; B60L 5/12; B60L 5/16; B60L 5/19; B60L 5/22; B60L 5/24; B60L 5/28; B60L 5/38; B60L 5/39; B60L 5/40; B61D 15/02; B66C 9/10; B66C 23/36; B66C 23/50; B66C 2700/0328; E01B 26/005; E01B 29/05; E01B 29/06; E01B 29/16
(Continued)

(56) References Cited

U.S. PATENT DOCUMENTS

| | | | | |
|---|---|---|---|---|
| 4,377,369 A | * | 3/1983 | Johnson, Jr. | B66C 23/50 414/798.2 |
| 5,100,278 A | * | 3/1992 | Westlake | B66C 23/50 104/5 |

(Continued)

FOREIGN PATENT DOCUMENTS

| | | | | |
|---|---|---|---|---|
| CN | 114873489 A | * | 8/2022 | B66C 23/84 |
| EP | 3456601 A1 | * | 3/2019 | B60M 1/28 |

(Continued)

OTHER PUBLICATIONS

Written Opinion and International Search Report for Int'l. Patent Appln. No. PCT/US2023/076183, mailed Jan. 29, 2024 (8 pgs).

Primary Examiner — S. Joseph Morano
Assistant Examiner — James William Jones
(74) Attorney, Agent, or Firm — Procopio, Cory, Hargreaves & Savitch LLP

(57) ABSTRACT

Dynamic energy transfer (DET) systems are costly and time-consuming to install. Accordingly, an installation system is disclosed that comprises stowage for rail segments and poles, two strategically positioned cranes, and/or strategically positioned platforms, to enable less expensive and faster installation of the various components of a DET system. Installation, utilizing the installation system, can significantly decrease the cost of installation, while increasing the rate of installation and maintaining safety.

20 Claims, 5 Drawing Sheets

(51) Int. Cl.

| | | |
|---|---|---|
| *B60L 5/38* | (2006.01) | |
| *B60L 5/39* | (2006.01) | |
| *B60L 50/53* | (2019.01) | |
| *B60M 1/28* | (2006.01) | |
| *B60M 1/30* | (2006.01) | |
| *B60M 7/00* | (2006.01) | |
| *B61D 15/02* | (2006.01) | |
| *B66C 9/10* | (2006.01) | |
| *B66C 23/36* | (2006.01) | |
| *B66C 23/50* | (2006.01) | |
| *E01B 26/00* | (2006.01) | |
| *B60L 5/12* | (2006.01) | |
| *B60L 5/19* | (2006.01) | |
| *E01B 29/05* | (2006.01) | |
| *E01B 29/06* | (2006.01) | |
| *E01B 29/16* | (2006.01) | |

(52) U.S. Cl.
CPC ............... *B60L 50/53* (2019.02); *B60M 1/28* (2013.01); *B60M 1/30* (2013.01); *B60M 7/00* (2013.01); *B61D 15/02* (2013.01); *B66C 9/10* (2013.01); *B66C 23/36* (2013.01); *B66C 23/50* (2013.01); *E01B 26/005* (2013.01); *B60L 5/12* (2013.01); *B60L 5/19* (2013.01); *B60L 2200/36* (2013.01); *B60L 2200/40* (2013.01); *B66C 2700/0328* (2013.01); *E01B 29/05* (2013.01); *E01B 29/06* (2013.01); *E01B 29/16* (2013.01)

(58) Field of Classification Search
USPC ..... 191/6, 45 R, 22, 49, 50, 53, 66; 104/5, 6
See application file for complete search history.

(56) References Cited

U.S. PATENT DOCUMENTS

| | | | | |
|---|---|---|---|---|
| 5,222,435 | A | * | 6/1993 | Theurer .................. E01B 29/05 |
| | | | | 104/2 |
| 2019/0093382 | A1 | | 3/2019 | Sauber et al. |
| 2019/0264413 | A1 | | 8/2019 | Schlatter et al. |
| 2021/0066917 | A1 | | 3/2021 | Sanders et al. |

FOREIGN PATENT DOCUMENTS

| | | | | |
|---|---|---|---|---|
| FR | 3077228 | A1 * | 8/2019 | .............. B60M 1/28 |
| JP | 2021175305 | A | 11/2021 | |
| KR | 1020220001856 | A | 1/2022 | |
| RU | 2418735 | C1 * | 5/2011 | .............. B66C 23/36 |
| WO | WO-2019061008 | A1 * | 4/2019 | .............. B66C 23/50 |

* cited by examiner

PROCESS AND SYSTEM FOR POLE AND CONDUCTOR INSTALLATION FOR CHARGING WHILE MOVING

TECHNICAL FIELD

The embodiments described herein are generally directed to dynamic energy transfer (DET) systems, and, more particularly, to a process and system for installing a DET system.

BACKGROUND

Dynamic energy transfer (DET), which includes charging while moving (CWM), refers to charging an electric machine while that machine is moving. For example, the machine may be equipment in an industrial environment, such as mining, construction, transportation, energy exploration, farming, or the like. However, it should be understood that DET is not limited to any particular environment.

In a typical setup, a DET system may comprise conductors, such as conductive rails, and conductor support infrastructure, such as poles which support the conductors at elevated positions along a roadway, track, or other movement pathway. The installation of these conductors with the conductor support infrastructure is expensive and consumes significant time and resources. Thus, the installation process contributes significantly to the total cost of ownership for DET systems, and may hinder wider proliferation and adoption of DET systems.

The present disclosure is directed toward overcoming one or more of the problems discovered by the inventor, including a reduction in the time, effort, and expense required to install DET systems.

SUMMARY

In an embodiment, an installation system comprises: a mobile base configured for stowage of a plurality of rail segments in a first area and a plurality of poles in one or more second areas, wherein the mobile base has a first side and a second side that is opposite the first side across a longitudinal axis of the mobile base; and two cranes on the first side of the mobile base, wherein the two cranes are spaced apart by a distance parallel to the longitudinal axis of the mobile base, wherein each of the two cranes is configured to lift a pole from at least one of the one or more second areas, and carry and lower the pole to an installation area that is lateral to the second side of the mobile base, and wherein the two cranes are configured to collectively lift one or more rail segments, by respective lift points, from the first area, and carry and lower the rail segment onto one or more poles in the installation area.

In an embodiment, a method of installing a dynamic energy transfer (DET) system, comprises, for each of a plurality of positions: conveying a mobile installation system to the position, wherein the mobile installation system comprises two cranes and stowage for a plurality of rails and a plurality of poles of the DET system; operating each of the two cranes to lift a pole from the stowage and install the pole in an installation area, such that two poles are installed in the installation area; and operating the two cranes to lift one or more rail segments from the stowage and install the one or more rail segments on the two poles.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
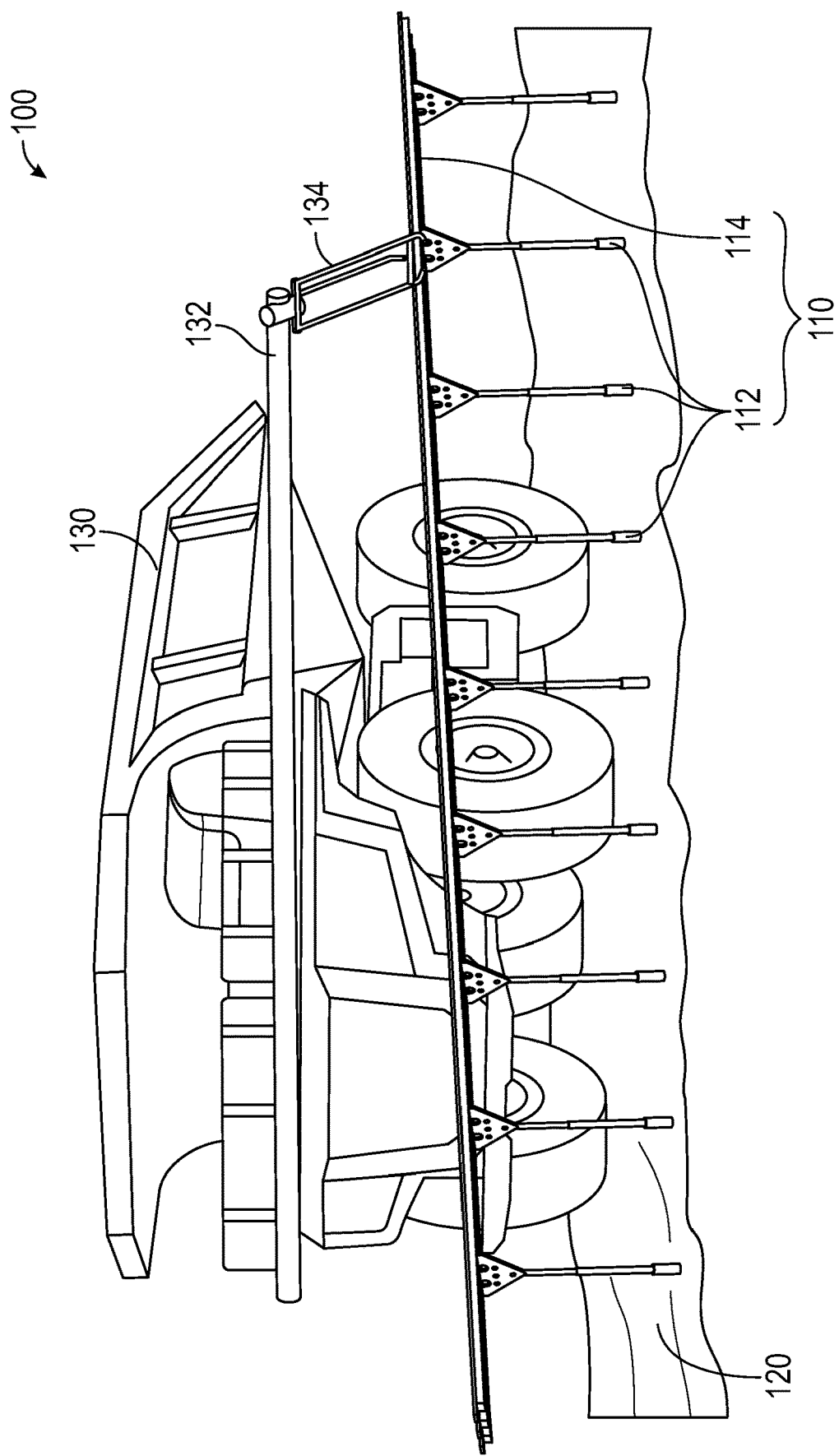
FIG. 1 illustrates an operational environment of a DET system, according to an example.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description. In addition, it should be understood that the various components illustrated herein are not necessarily drawn to scale. In other words, the features disclosed in various embodiments may be implemented using different relative dimensions within and between components than those illustrated in the drawings.

FIG. 1 illustrates an operational environment 100 of a DET system 110, according to an embodiment. Operational environment 100 comprises one or a plurality of movement pathways 120 (e.g., haul road(s) or other paved or unpaved road(s), railroad track(s), water canal, etc.), along which one or a plurality of machines 130 travel. Operational environment 100 may include an environment in which one or a plurality of machines 130 perform a task associated within an industry, such as mining, construction, transportation, energy exploration, farming, or the like. For example, operational environment 100 could include one or more mine sites in which a plurality of machines 130 cooperate to perform tasks associated with mining, using a plurality of movement pathways 120 to haul material between various locations within the mine site. However, it should be understood that disclosed embodiments are not limited to any particular environment.

Machine 130 may be an electric vehicle that uses one or more electric motors (e.g., as opposed to a combustion engine) for propulsion. Each machine 130 may comprise an on-board battery system that comprises one or more rechargeable batteries configured to supply power to the electric motor(s) of machine 130. Alternatively, instead of a battery-powered machine, machine 130 could be a diesel-powered machine, a fuel-cell-powered machine, a hybrid machine (e.g., powered by both diesel and an on-board battery system), or the like. While machine 130 is illustrated as a dump truck, it should be understood that machine 130 may be any type of equipment, including a wheel loader, asphalt paver, backhoe loader, skid steer, track loader, cold planer, compactor, dozer, electric rope shovel, excavator, forest machine, hydraulic mining shovel, material handler, motor grader, pipe-layer, road reclaimer, telehandler, tractor-scraper, or the like, as well as ordinary road vehicles (e.g., automobiles, semi-trucks, etc.) or marine vessels (e.g., tug boat, ship, etc.).

DET system 110 may be installed along one or more movement pathways 120 within operational environment 100. For example, DET system 110 may be installed along one or both sides of movement pathway(s) 120. DET system 110 may comprise a plurality of poles 112 as the conductor support infrastructure. Poles 112 may be spaced apart along the side of a movement pathway 120 at substantially equidistant intervals (e.g., approximately 6 meter intervals). Rail segments 114 may be mounted on top of poles 112 and connected to each other using fasteners, referred to herein as "fishplates," to form a continuous rail that is elevated off the ground.

In an embodiment, rail segments 114 are conductive. The rail, formed by a plurality of rail segments 114, may be electrically connected to a power supply (e.g., the distribution network of a power grid or microgrid), such that electricity flows through the rail. Machine 130 may comprise an arm 132 that extends from a side of machine 130. A receiver 134 at the end of arm 132 contacts the rail formed by rail segments 114. Arm 132 and receiver 134 form a conductive path from the contact end of receiver 134 to the on-board battery system of machine 130. Arm 132 and receiver 134 are configured to allow for some level of imperfection or variation in the contact region between receiver 134 and the rail. Thus, as machine 130 travels along a movement pathway 120, with receiver 134 contacting the rail, electricity from the conductive rail flows through receiver 134 and arm 132 to charge the on-board battery system of machine 130, which powers the motor(s) of machine 130. Consequently, machine 130 is charged while moving through operational environment 100.

The length of poles 112 may be configured to elevate rail segments 114 to a safe height above the ground. A safe height may be a height that most humans (e.g., 99% of humans based on average reach) are unable to reach without assistance. For example, the rail may be elevated at least 3 meters above the ground. This prevents workers within the operational environment 100 from accidentally touching the rail, thereby reducing the likelihood of electrocution and improving safety. It should be understood that poles 112 may be set within the ground, such that the length of each pole should be defined to include both a safe height above the ground and the height of the pole 112 that extends into the ground. One end of each pole 112 may be seated within a hole in the ground, such as a ground screw, while the other end of each pole 112 supports one or more rail segments 114. Alternatively, one end of each pole 112 may be fixed within a weighted footing (e.g., concrete barrier), while the other end of each pole 112 supports one or more rail segments 114.

For enhanced flexibility and safety, the rail may comprise three parallel rails, with each parallel rail formed from a plurality of connected rail segments 114. One outer rail may carry a positive charge, the opposite outer rail may carry a negative charge, and the center rail may be grounded. The grounded center rail enables low fault current and provides the flexibility to have different voltage levels. In addition, in the event of a collision with DET system 110 (e.g., a collision between machine 130 and DET system 110), chances are that the center rail will be included in the circuit, to thereby prevent electrocution of workers involved in or responding to the collision.

Figure 2:
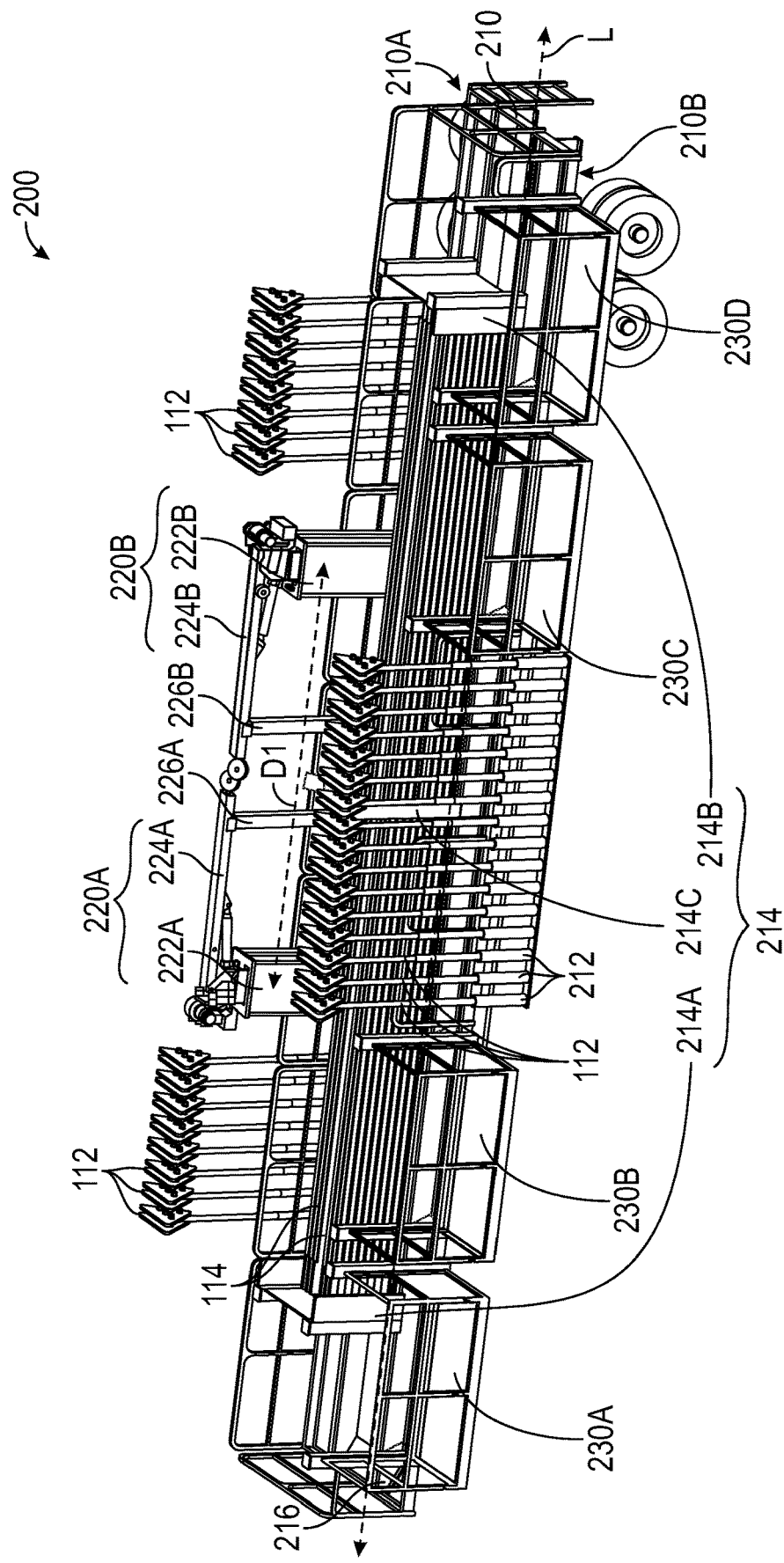
FIG. 2 illustrates a perspective view of an installation system for installing a DET system within an operational environment, according to an embodiment.

FIG. 2 illustrates a perspective view of an installation system 200 for installing a DET system 110 within an operational environment 100, according to an embodiment. Installation system 200 may comprise a mobile base 210 to support the various components of installation system 200, as well as to move these components as a single unit. Mobile base 210 may comprise a flatbed trailer with wheels that is configured to connect to a tractor via a connector 216. Thus, when connected, the tractor may convey mobile base 210 along the movement pathway 120 along which DET system 110 is being installed. The tractor may also serve to stabilize mobile base 210 during installation of DET system 110, as well as to supply power to installation system 200, if necessary. For example, connector 216 may provide both a mechanical connection and an electrical connection between the tractor and mobile base 210. In an alternative embodiment, installation system 200 could be self-propelled, comprise a flatbed train car as mobile base 210 (e.g., to be pushed or pulled by a train engine along a movement pathway 120 comprising a railroad track), or be conveyed in any other manner that is suitable for the particular movement pathway 120 along which DET system 110 is to be installed. In any case, installation system 200 is mobile along movement pathway(s) 120.

In an embodiment, installation system 200 may comprise an on-board battery system (not shown) comprising one or more rechargeable batteries. On-board battery system 215 may be configured to be charged by the tractor through an electrical connection with the tractor, when connector 216 of base 210 is connected to a corresponding connector of the tractor. Alternatively or additionally, on-board battery system 215 may be charged from any other power source via an electrical plug in connector 216 or elsewhere in installation system 200. On-board battery system 215 may be conductively connected to electrical components of installation system 200 to power those electrical components. For example, on-board battery system 215 may be conductively connected to one or more cranes 220, illustrated as cranes 220A and 220B, which may be motorized. On-board battery system 215 may also be conductively connected to one or more platforms 230, illustrated as platforms 230A, 230B, 230C, and 230D. Each platform 230 may be motorized to raise and/or lower, and/or to extend outward laterally off of or out of mobile base 210 to facilitate installation and retract inward laterally onto or into mobile base 210 for stowage. Extension of each platform 230 may comprise movement in a horizontal direction away from mobile base 210 and/or unfolding of platform 230 down from a substantially vertical position to a substantially horizontal position, whereas retraction of each platform 230 may comprise movement in a horizontal direction towards mobile base 210 and/or folding of platform 230 from a substantially horizontal position to a substantially vertical position. On-board battery system 215 may be centralized in a single battery pack (e.g., in or near connector 216), or may be disbursed as separate battery packs at the locations of respective powered components of installation system 200.

Installation system 200, and particularly mobile base 210, may comprise stowage for a plurality of poles 112 in one or more areas. In an embodiment, the plurality of poles 112 are stowable in a plurality of areas arranged around a periphery of mobile base 210. For example, rows of releasable stowage systems 212 may be positioned in a plurality of areas around a portion of the periphery of base 210. Each releasable stowage system 212 may be configured to fix a pole 112 in place, so that the pole 112 does not move during movement of installation system 200, but can be easily released during an installation process. In the illustrated embodiment, each releasable stowage system 212 comprises a sheath that is open at the top and closed at the bottom, so that a pole 112 can slide down into the sheath and be pulled up out of the sheath. In other words, each sheath in each row of sheaths is configured to hold a pole 112 in an upright position. However, in an alternative embodiment, releasable stowage system 212 could comprise a strap or other fastener that can releasably fix a pole 112 within mobile base 210 or to the side of mobile base 210.

Installation system 200, and particularly mobile base 210, may comprise stowage for a plurality of rail segments 114 in one or more areas. In an embodiment, the plurality of rail segments 114 may be stowed in a single area located in a central portion of mobile base 210. The plurality of rail segments 114 may be stowed so that their longitudinal axes are substantially parallel to the longitudinal axis L of mobile base 210.

The stowage area for the plurality of rail segments 114 may comprise a receptacle 214 that is configured to hold a stack of the plurality of rail segments 114, and which has a longitudinal axis that is parallel to longitudinal axis L of mobile base 210. Receptacle 214 prevents translation of the plurality of rail segments 114 horizontally across mobile base 210 and/or otherwise enables the plurality of rail segments 114 to be fixed in place during movement of installation system 200. Receptacle 214 may comprise walls or posts on all four sides of the stack of rail segments 114 to prevent rail segments 114 from sliding across base 210. In the illustrated embodiment, receptacle 214 comprises a section 214A and a section 214B, which mirrors section 214A, at opposing ends of the stack of rail segments 114 along longitudinal axis L, as well as a section 214C halfway between sections 214A and 214B. Each of sections 214A and 214B comprises two posts, a wall orthogonal to longitudinal axis L to prevent translation of rail segments 114 along longitudinal axis L, and two walls parallel to longitudinal axis L to prevent translation of rail segments 114 at any angle with respect to longitudinal axis L. Section 214C comprises two posts on opposing lateral sides of the stack of rail segments 114, to brace the middle of rail segments 114. In an alternative embodiment, the translation of rail segments 114 across mobile base 210 may be prevented in other manners, such as directly or indirectly fixing the stack of rail segments 114 to mobile base 210 using other means.

In an embodiment in which the rail of DET system 110 comprises a plurality of parallel rails (e.g., three parallel rails with a central grounded rail, as discussed elsewhere herein), the stack of rail segments 114 may be at least three rail segments 114 wide, such that at least three rail segments 114 can be lifted off the top of the stack and installed at the same time as a single unit. In this case, receptacle 214 is sized to hold a stack of the plurality of rail segments 114 that is at least three rail segments 114 in width.

In an embodiment, each rail segment 114 is curved according to a slight angle of curvature. In this case, along sections in which the rail of DET system 110 is to be generally straight (e.g., to match a linear movement pathway 120), rail segments 114 are alternated, such that a rail segment 114 that is concave towards movement pathway 120 (e.g., with the apex of the curve away from movement pathway 120) is adjacent on both ends to rail segments 114 that are convex towards movement pathway 120 (e.g., with the apex of the curve towards movement pathway 120), and vice versa. It should be understood that, in this case, the rail will have a wavelike profile along straight sections. Conversely, along sections in which the rail is to be curved (e.g., to match a curved movement pathway 120), rail segments 114 may be joined in the same orientation of curvature to thereby extend the curve. The curvature in each rail segment 114 reduces or eliminates the stress of thermal expansion and contraction on joints in the rail of DET system 110.

In the embodiment in which the rail is three rail segments 114 wide with a slight curve in each rail segment 114, the stack of rail segments 114 on base 210 may be six rail segments 114 wide. In this case, receptacle 214 may be sized to hold two separate stacks of the plurality of rail segments 114 in opposing orientations of curvature. For example, a first stack that is three rail segments 114 in width may be positioned on one lateral side of the overall stack, and a second stack that is three rail segments 114 in width may be positioned on the opposite lateral side of the overall stack. The apex of the curve for both the first and second stacks may face inward or outward, such that the curve of the first stack is concave in the opposite direction as the curve of the second stack. This enables the curvature of rail segments 114 to be alternated during installation without having to rotate any of rail segments 114, since a rail segment 114 (or bundle of parallel rail segments 114) can be lifted from the first stack for the installation of one segment of the rail, lifted from the second stack for the installation of the next segment of the rail, lifted from the first stack for the installation of the next segment of the rail, and so on and so forth. If the rail of DET system 110 needs to curve, rail segments 114 may be lifted from the same stack for consecutive installations, according to the direction in which the rail is to curve (i.e., from the first stack if the curve is in one direction, and from the second stack if the curve is in the opposite direction).

In an embodiment, the stack of rail segments 114 does not exceed one meter in height. This may prevent damage to rail segments 114, improve safety, reduce costs of installation system 200, and/or the like. As one example, the stack comprises two opposite-facing stacks of curved rail segments 114, with each stack being three rail segments 114 wide and eight rail segments 114 high. In this case, the overall stack comprises forty-eight rail segments 114, which may be loaded as eight pallets of six rail segments 114 each. However, it should be understood that rail segments 114 may be stacked in any manner and in any number that is suitable for the applicable design objective(s) (e.g., weight, cost, safety, speed, etc.).

In an embodiment, fishplates for connecting the ends of rail segments 114 to adjacent rail segments 114 may be pre-affixed to one end of each rail segment 114 in the stack of rail segments 114. In other words, one half of each fishplate is affixed to an end of a rail segment 114, while the other half of the fishplate remains unaffixed and the opposite end of the rail segment 114 is not affixed to any fishplate. Thus, the fishplates do not have to be separately stored and installed. It should be understood that each rail segment 114 should have the fishplate affixed to the same end as every other rail segment 114 when rail segments 114 are stowed on mobile base 210. As soon as a rail segment 114 is placed on poles 112, the unaffixed half of the fishplate may be affixed to an adjacent rail segment 114, to thereby join the two rail segments 114. In an alternative embodiment, the fishplates may be stored on mobile base 210, separate from rail segments 114, and affixed to adjacent rail segments 114 as rail segments 114 are placed.

Mobile base 210 comprises a first side 210A and a second side 210B that is opposite first side 210A across longitudinal axis L of mobile base 210. In an embodiment, installation system 200 comprises two cranes 220A and 220B on first side 210A of mobile base 210. Each crane 220 may comprise a boom 222 and a jib 224. For example, crane 220A comprises boom 222A and jib 224A, and crane 220B comprises boom 222B and jib 224B. Each boom 222 may be configured to rotate or articulate the corresponding jib 224 through a range of angles. The range of angles could be 360-degrees, 180-degrees, 120-degrees, 90-degrees, or any other range of degrees. However, it is generally beneficial for the range of angles to cover at least the areas of mobile base 210 on which poles 112 and rails 114 are stowed. Each jib 224 may be extendable and retractable, so as to be able to shorten and lengthen during use. In an embodiment, a post 226 may be provided for supporting jibs 224 when cranes 220 are stowed for transport. For example, post 226A supports jib 224A when crane 220A is not in use, and post 226B supports jib 224B when crane 220B is not in use.

Cranes 220A and 220B may be spaced apart by a distance D1, parallel to longitudinal axis L of mobile base 210. Distance D1 may be at least 5 meters, and may be strategically defined based on the distance interval between adjacent poles 112 in DET system 110. For example, distance D1 may be slightly less than the distance interval between adjacent poles 112 in DET system 110. Each of cranes 220A and 220B may be configured to lift a pole 112 from at least one of the areas in which poles 112 are stowed, and carry and lower the pole 112 to an installation area that is lateral to second side 210B of mobile base 210. In addition, cranes 220A and 220B may be configured to collectively lift one or more rail segments 114 (e.g., a single rail segment 114, or a bundle of two or at least three rail segments 114), by respective lift points, from the area in which rail segments 114 are stowed, and carry and lower rail segment(s) 114 onto one or more poles 112 in the installation area. For long, flexible rail segment(s) 114, two lift points, as opposed to a single central lift point, may prevent damage to the rail segment(s) 114 and improve safety during the installation process. For lifting of rail segment(s) 114, the rail segment(s) 114 may be supported in a cradle, connected to jib 224. The use of a cradle enables easy bundling of a plurality of rail segments 114 into a single unit for lifting, and can prevent damage to rail segments 114.

In an embodiment, installation system 200 comprises one or a plurality of platforms 230, such as platforms 230A, 230B, 230C, and 230D. Each platform 230 may be configured to slide off of or fold out from second side 210B of mobile base 210 to extend out over second side 210B of mobile base 210, and retract back onto or fold back into second side 210B of mobile base 210 so as to not protrude, or to not significantly protrude, over second side 210B of mobile base 210. Alternatively, each platform 230 could extend outward from second side 210B of mobile base 210 and retract into second side 210B of mobile base 210. Additionally or alternatively, each platform 230 may be configured to rise and/or lower in a vertical direction, with or without movement in a horizontal direction. While four platforms 230A, 230B, 230C, and 230D are illustrated, installation system 200 may comprise any number of platforms 230, including zero platforms. However, it is generally beneficial for installation system 200 to have at least two platforms 230 corresponding to each crane 220, and to extend at least as far as the longitudinal ends of each rail segment 114.

Figure 3:
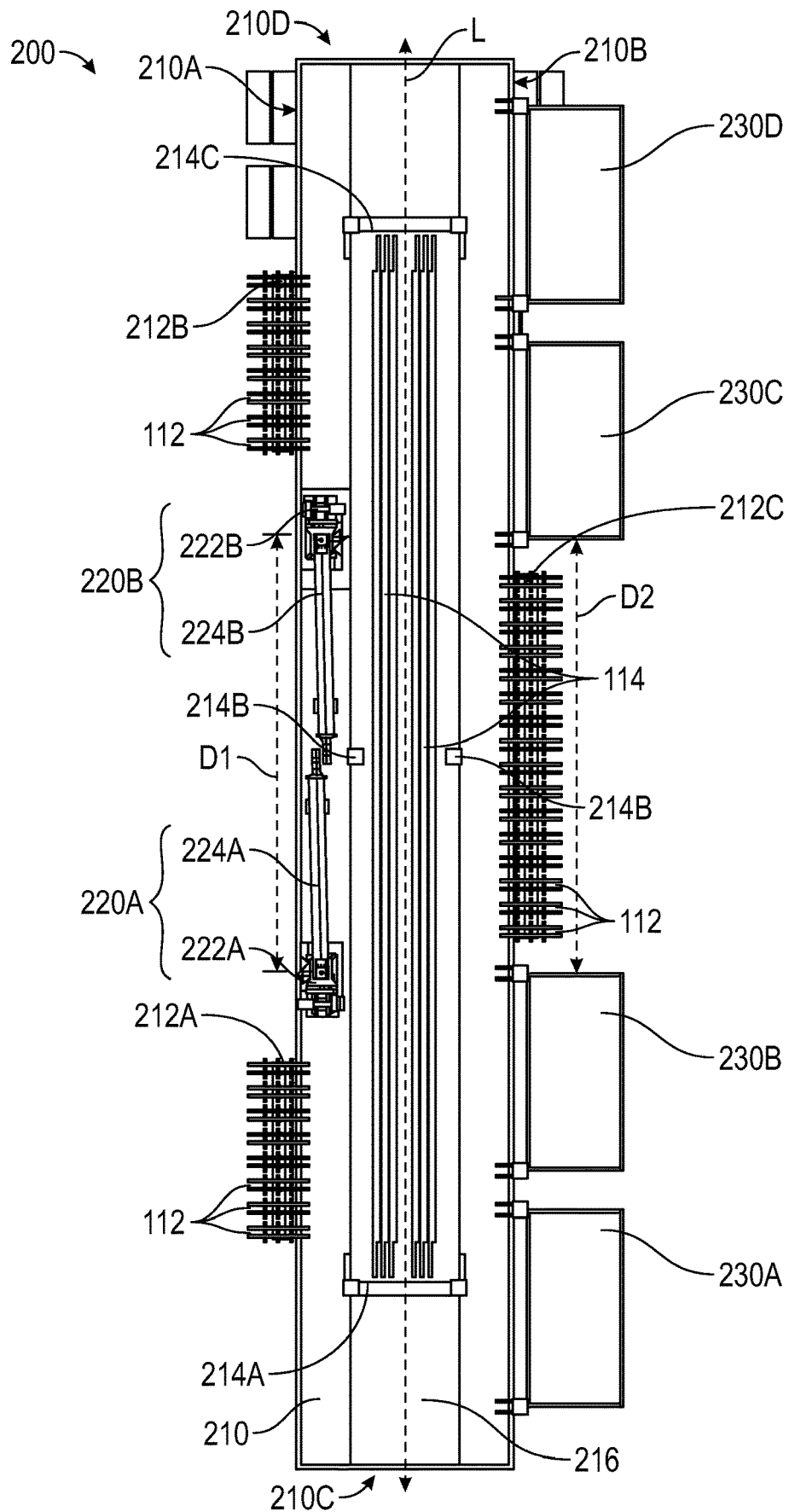
FIG. 3 illustrates a top-down view of an installation system for installing a DET system within an operational environment, according to an embodiment.

FIG. 3 illustrates a top-down view of an installation system 200 for installing a DET system 110 within an operational environment 100, according to an embodiment. In the illustrated embodiment, there are a set of poles 112 stowed in a row of releasable stowage systems 212 near each crane 220 and between platforms 230B and 230C. For example, a row of releasable stowage systems 212A is provided between crane 220A and one end 210C of mobile base 210 that is on the opposite side of crane 220A as crane 220B, a row of releasable stowage systems 212B is provided between crane 220B and the opposite end 210D of mobile base 210 that is on the opposite side of crane 220B as crane 220A, and a row of releasable stowage system 210C is provided between platforms 230B and 230C. However, it should be understood that other configurations are possible. In general, installation system 200 should be capable of stowing at least as many poles 112 as are necessary to support the number of rail segments 114 that are stowed on installation system 200.

Platforms 230 are illustrated as extended from second side 210B of mobile base 210. Although not shown, platforms 230 may be configured to retract onto (e.g., by sliding horizontally or folding vertically) or into base 210 to facilitate transportation. Four platforms 230A, 230B, 230C, and 230D are illustrated. Platforms 230B and 230C are spaced apart by a distance D2, parallel to longitudinal axis L of mobile base 210, that is at least the distance D1 or otherwise similar to the distance D1 by which cranes 220A and 220B are spaced apart. Platform 230A is between platform 230B and end 210C on a side of platform 230B that is opposite platform 230C, and platform 230D is between platform 230C and end 210D on a side of platform 230C that is opposite platform 230B. In an alternative embodiment, installation system 200 could consist of fewer or more platforms 230. For example, platforms 230A and 230B could be combined into a single, longer platform 230 and/or platforms 230C and 230D could be combined into a single, longer platform 230. Alternatively, platforms 230A and 230D may be omitted, in which case platforms 230B and 230C could be extended in length along longitudinal axis L towards ends 210C and 210D, respectively, of installation system 200.

Figure 4:
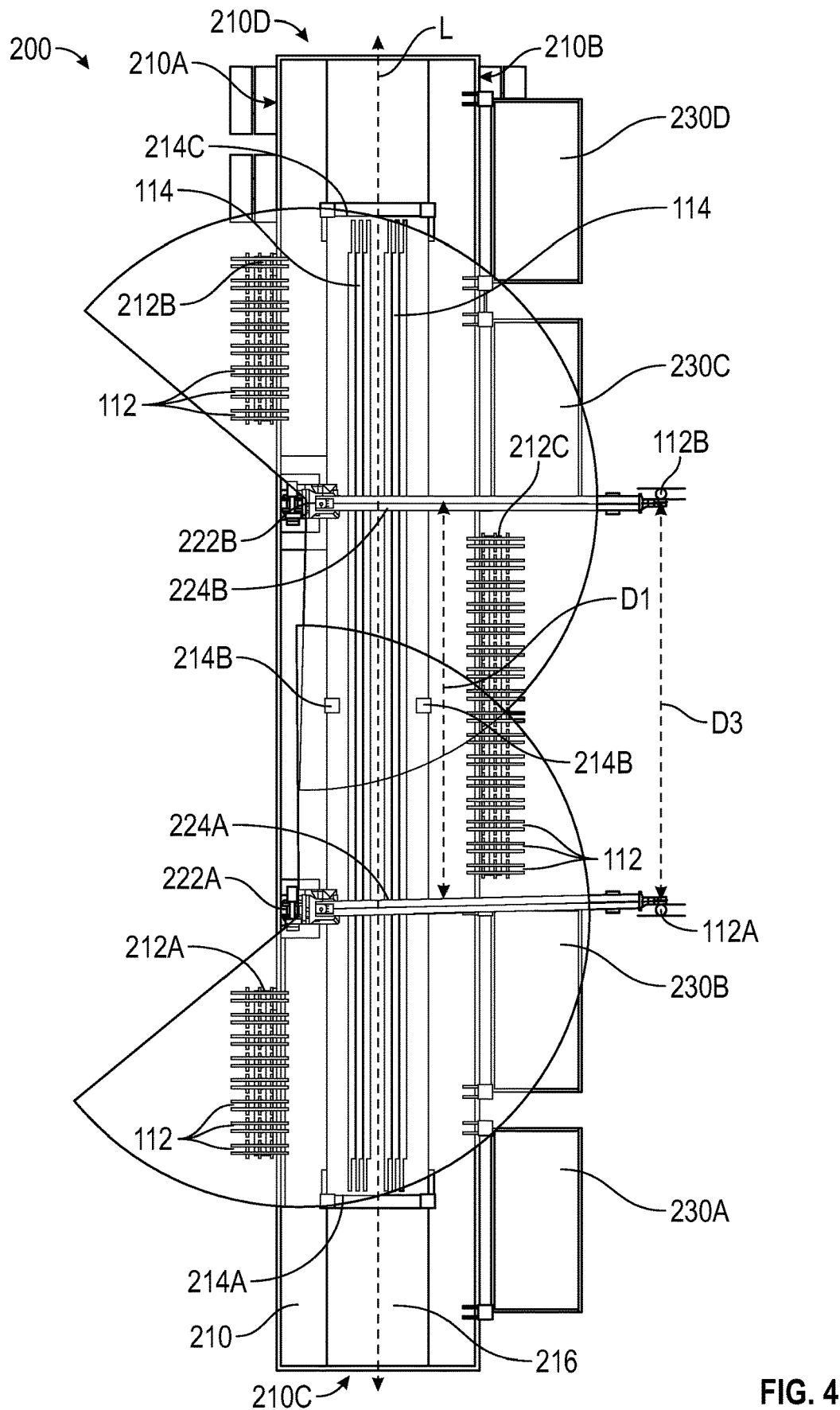
FIG. 4 illustrates a top-down view of an installation system following deployment of cranes, according to an embodiment.

FIG. 4 illustrates a top-down view of an installation system 200 following deployment of cranes 220, according to an embodiment. At illustrated, each boom 222 may be configured to rotate or articulate the corresponding jib 224 in at least a range of angles that enables the jib 224 to extend over each pole 112 stowed on side 210A of mobile base 210, and at least half of the set of poles 112 stowed on second side 210B of installation system 200. For example, boom 222A is configured to rotate jib 224A over the entire row of releasable stowage systems 212A, as well as at least one half of the row of releasable stowage systems 212C nearest to end 210C. Similarly, boom 222B is configured to rotate jib 224B over the entire row of releasable stowage systems 212B, as well as at least the other half of the row of releasable stowage systems 212C nearest to end 210D. In addition, each boom 222 may be configured to extend orthogonally over the stack of rail segments 114 and second side 210B of mobile base 210. Thus, each crane 220 can be used to lift a pole 112 from a respective set of poles 112, as well as lift one side of a rail segment 114 over second side 210B of mobile base 210. It should be understood that the range of angles could be greater than what is shown, including a full 360-degrees, and may be the same or different for different cranes 220.

The distance D1 between cranes 220A and 220B may generally correspond to the distance interval D3 between poles 112 within CRM system 110. For example, distance D1 between the ends of jibs 224A and 224B, when extended orthogonally over second side 210B of mobile base 210, may be slightly less than distance interval D3 between adjacent installed poles 112A and 112B. As one non-limiting example, if distance interval D3 is 6 meters, distance D1 may be set to 5.8 meters. Thus, when cranes 220 are deployed, as illustrated in FIG. 4, the end of each jib 224 may be slightly inside the space between adjacent installed poles 112A and 112B. During the installation process, jib 224 may be rotated over a pole 112 stowed on base 210, pole 112 may be lifted by a hook or cradle on jib 224, jib 224 may be rotated and extended orthogonally over second side 210B of mobile base 210, and pole 112 may be seated within a hole in the ground (e.g., ground screw) and released from jib 224.

Once two adjacent poles 112A and 112B have been installed in their respective ground holes, each of jibs 224A and 224B may be attached to respective lifting points, via a respective cradle, on a rail segment 114 or set of rail segments 114 (e.g., three parallel rail segments 114) on the top of the stack of rail segments 114 in receptacle 214. It should be understood that the distance between the lifting points should be suitably determined based on the length and/or other characteristics of rail segments 114, and each lifting point should be the same distance from the respective end of a given rail segment 114 as the other lifting point. For example, the lifting points for 12-meter rail segments 114 should be between 5-10 meters apart. The cradles may lift the rail segment(s) 114 and slide along the jib 224 to position the rail segment(s) 114 over adjacent installed poles 112A and 112B. Then, the rail segment(s) 114 may be released from the cradles, and affixed to poles 112A and 112B, as well as to an adjacent (e.g., previously installed) section of rail segment(s) 114 by means of fishplate(s).

When installing poles 112 and rail segments 114, platforms 230 may be deployed to provide easy access by technicians to the tops of placed poles 112 (e.g., 112A and 112B) and to the connection points between poles 112 and rail segments 114, as well as to the connection points between adjacent rail segments 114. As mentioned elsewhere herein, the height of poles 112 above the ground may be sufficient to prevent most human contact to rail segments 114. When jibs 224A and 224B are positioned orthogonally to the edge of base 210, platforms 230B and 230C are positioned on the same side of jibs 224A and 224B, respectively, as installed poles 112A and 112B (i.e., nearer to ends 210C and 210D, respectively). Consequently, technicians standing on platforms 230B and 230C have easy access to the tops of placed poles 112A and 112B, respectively, despite their elevations. In addition, a technician standing on platform 230A has easy access to one end of placed rail segment(s) 114, and a technician standing on platform 230D has easy access to the opposite end of placed rail segment(s) 114, despite the elevations of rail segment(s) 114. Thus, via platforms 230, technicians may easily position poles 112, position rail segment(s) 114, fasten rail segment(s) 114 to poles 112, install fishplates on the ends of installed rail segment(s) 114, fasten rail segment(s) 114 to previously placed rail segment(s) 114, and/or the like.

Figure 5:
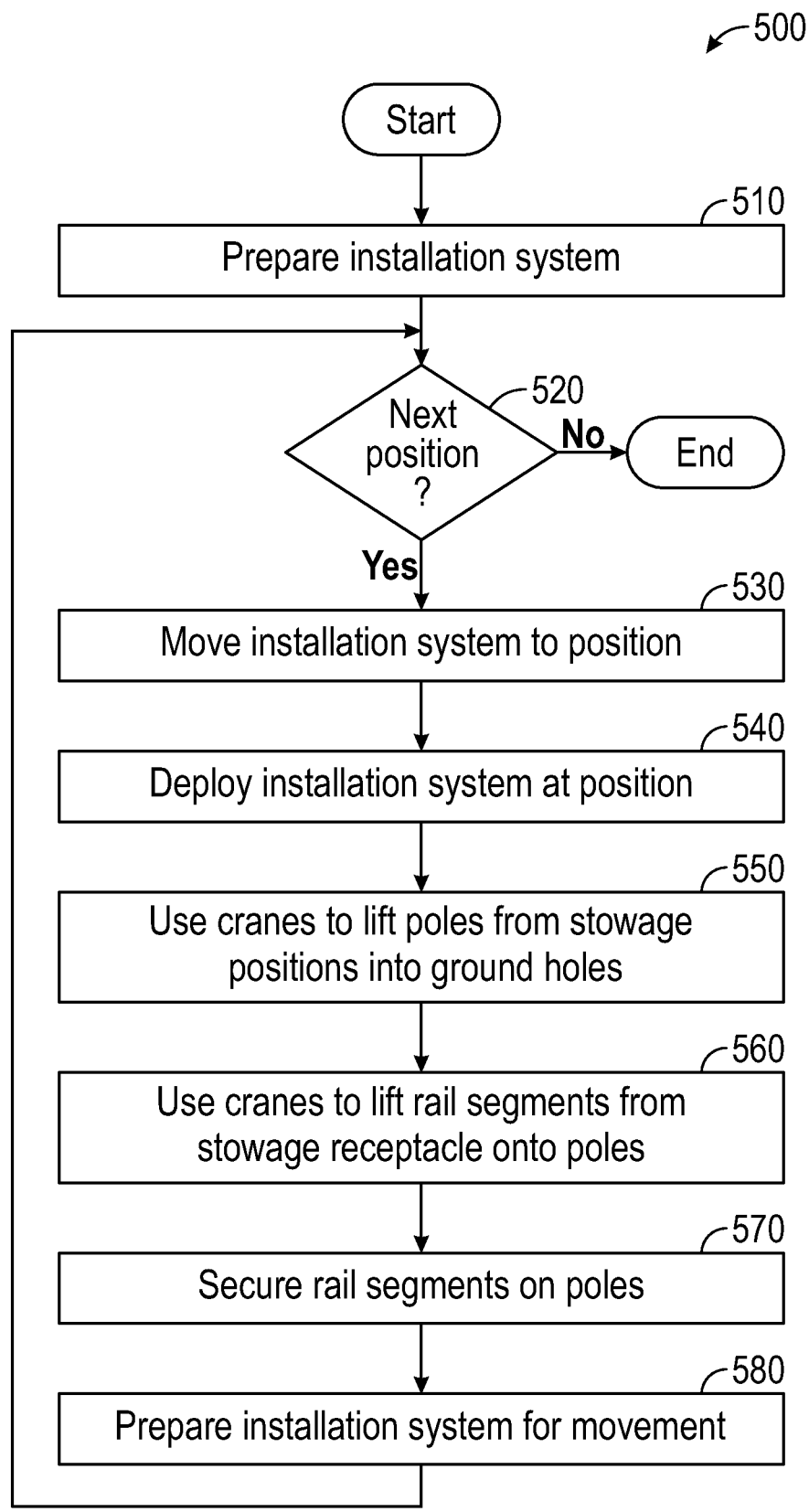
FIG. 5 illustrates a process for installing a DET system in an operational environment 100 using an installation system, according to an embodiment.

FIG. 5 illustrates a process 500 for installing a DET system 110 in an operational environment 100 using an installation system 200, according to an embodiment. While installation process 500 is illustrated with a certain arrangement and ordering of subprocesses, installation process 500 may be implemented with fewer, more, or different subprocesses and a different arrangement and/or ordering of subprocesses. In addition, it should be understood that any subprocess, which does not depend on the completion of another subprocess, may be performed before, after, or in parallel with that other independent subprocess, even if the subprocesses are described or illustrated in a particular order.

Initially, in subprocess 510, installation system 200 is prepared for operation. For example, in an embodiment in which installation system 200 is implemented as a trailer, installation system 200 may be connected to a tractor (e.g., semi-truck) via connector 216. In addition, an operator may perform a safety check. The safety check may include, without limitation, walking around the tractor and installation system 200, checking that cranes 220 and platforms 230 are locked in their stowed positions, checking that poles 112 and rail segments 114 are properly stowed, ensuring that wheel chocks are removed and stowed, and/or the like.

If a section of DET system 110 still needs to be installed at a further position (i.e., "Yes" in subprocess 520), installation system 200 is conveyed to the next position in subprocess 530. For example, installation system 210 may be pulled to the next position by a tractor that is connected to installation system 210 via connector 216. It should be understood that in the first iteration of subprocess 530, installation system will be conveyed to the initial position at which installation of DET system 110 is to begin. If installation of DET system 110 is complete (i.e., "No" in subprocess 520), process 500 may end.

In subprocess 540, installation system 200 is deployed at the position. Deployment may comprise setting wheel chocks. In addition, at least in the initial iteration of subprocess 540, deployment may comprise performing a checkout of cranes 220 and platform(s) 230 to ensure they are in serviceable condition, unlocking and deploying cranes 220, unlocking and deploying platform(s) 230 to their working positions, and/or the like. In an embodiment, the tractor may be maintained in an operating state, such that it continues to supply power to installation system 200. Alternatively, installation system 200 could be powered by an on-board battery system or an on-board power generator.

In subprocess 550, each of cranes 220A and 220B are used to lift a respective pole 112 (e.g., 112A and 112B) from stowage (e.g., row of releasable stowage systems 212) and install the pole 112 in an installation area that is lateral to second side 210B of mobile base 210, such that two poles are installed in the installation area at a time. Installing poles 112 may comprise seating the poles 112 in respective ground holes (e.g., ground screw). During this operation, workers may stand on platforms 230B and 230C to guide each pole 112 into its respective ground hole, and release each pole 112 from the respective jib 224. Notably, in this manner, two poles 112 can be installed at the same time to speed up installation process 500. The ground holes may be pre-drilled or otherwise created using a separate tool (e.g., an auger or other hole-digging or ground-screw-creating tool fashioned to a skid steer or other machine), or created during installation process 500 using a tool integrated into installation system 200.

In subprocess 560, each of cranes 220A and 220B are used to lift one or more rail segments 114 from stowage (e.g., receptacle 214). In an embodiment, in which the rail comprises N parallel rails (e.g., N=3), a bundle of N rail segments 114 may be lifted as a single unit by cranes 220A and 220B. Whether one or a plurality of rail segments 114 are lifted at a time, rail segment(s) 114 may be lifted by placing a cradle around each of two lift points, which are appropriately spaced apart along the longitudinal axis of rail segment(s) 114. Each cradle is connected to a jib 224 of a crane 220. In an embodiment, cranes 220 are strategically spaced apart at a distance D1 to match both a distance D3 between installed poles 112 and an appropriate distance between lift points. For example, distance D1 may be 5-6 meters. Once lifted, rail segment(s) 114 are translated laterally by moving the cradles, for example, along jibs 224 while jibs 224 are extended orthogonally over second side 210B of base 210 as illustrated in FIG. 4. Once, rail segment(s) 114 are over the installed poles 112 (e.g., 112A and 112B), rail segment(s) 114 may be lowered onto installed poles 112 and then released from the cradles. In an embodiment in which two stacks of rail segments 114 are used, rail segment(s) 114 may be lifted off of each stack in alternating fashion across iterations of subprocess 560.

In subprocess 570, rail segment(s) 114 are secured on poles 112. In particular, the placed rail segment(s) 114 may be fastened to poles 112 using any suitable fastening means (e.g., screws, nuts and bolts, straps, etc.). In addition, rail segment(s) 114 may be fastened to the most recently installed rail segment(s) 114 (e.g., in the most recent prior iteration of subprocess 570), for example, by affixing one or more fishplates to abutting ends of the two sets of rail segment(s) 114.

In subprocess 580, installation system 200 is prepared for movement. For example, wheel chocks may be removed and stowed. In addition, cranes 220 and/or platforms 230 may be locked in their stowed positions. However, in an alternative embodiment, if the next position is an incremental distance from the current position (e.g., to extend the DET system 110 from the current position), cranes 220 and/or platforms 230 may remain deployed to speed up installation process 500. In general, at least subprocesses 510, 540, and 580 could be omitted in alternative embodiments.

INDUSTRIAL APPLICABILITY

DET systems 110 are costly and time-consuming to install. Embodiments of installation system 200 enable less expensive and faster installation of a DET system 110 within an operational environment 100. For example, installation process 500 may be used to increase the rate of installation to one kilometer per twenty-four hours, while maintaining safety. Thus, installation system 200 with installation process 500 enables fast, repeatable, and safe installation of a DET system 110.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine or DET system. Hence, although the present embodiments are, for convenience of explanation, depicted and described as being implemented in a particular DET system, it will be appreciated that it can be implemented in various other types of DET systems, and in various other environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. An installation system comprising:
a mobile base configured for stowage of a plurality of rail segments in a first area and a plurality of poles in one or more second areas, wherein the mobile base has a first side and a second side that is opposite the first side across a longitudinal axis of the mobile base; and
two cranes on the first side of the mobile base, wherein the two cranes are spaced apart by a distance parallel to the longitudinal axis of the mobile base,
wherein each of the two cranes is configured to
lift a pole from at least one of the one or more second areas, and
carry and lower the pole to an installation area that is lateral to the second side of the mobile base, and
wherein the two cranes are configured to collectively
lift one or more rail segments, by respective lift points, from the first area, and
carry and lower the rail segment onto one or more poles in the installation area.

2. The installation system of claim 1, wherein the plurality of rail segments and the plurality of poles are components of a dynamic energy transfer (DET) system.

3. The installation system of claim 1, further comprising a plurality of platforms configured to extend over the second side of the mobile base.

4. The installation system of claim 3, wherein the plurality of platforms comprises a first platform and a second platform that are spaced apart by a distance, parallel to the longitudinal axis of the mobile base, that is at least the distance by which the two cranes are spaced apart.

5. The installation system of claim 4, wherein the plurality of platforms further comprises a third platform on a side of the first platform that is opposite the second platform, and a fourth platform on a side of the second platform that is opposite the first platform.

6. The installation system of claim 3, wherein each of the plurality of platforms is configured to retract onto or into the mobile base.

7. The installation system of claim 1, wherein the one or more second areas are a plurality of second areas arranged around a periphery of the mobile base.

8. The installation system of claim 1, wherein each of the one or more second areas comprises a row of sheaths, wherein each sheath is configured to hold a pole in an upright position.

9. The installation system of claim 1, wherein the first area is located in a central portion of the mobile base.

10. The installation system of claim 1, wherein the first area comprises a receptacle configured to hold a stack of the plurality of rail segments, wherein a longitudinal axis of the receptacle is parallel to the longitudinal axis of the mobile base.

11. The installation system of claim 10, wherein the receptacle is sized to hold a stack of the plurality of rail segments that is at least three rail segments in width.

12. The installation system of claim 11, wherein the two cranes are configured to collectively lift a bundle of at least three rail segments, by the respective lift points, as a single unit.

13. The installation system of claim 10, wherein each of the plurality of rail segments is curved, and wherein the receptacle is configured to hold two separate stacks of the plurality of rail segments in opposing orientations of curvature.

14. The installation system of claim 13, wherein each of the two separate stacks is at least three rail segments in width.

15. The installation system of claim 1, wherein the mobile base is a flatbed trailer, and wherein the installation system further comprises a connector configured to connect to a tractor.

16. The installation system of claim 1, wherein the distance by which the two cranes are spaced apart is at least 5 meters.

17. A method of installing a dynamic energy transfer (DET) system, the method comprising, for each of a plurality of positions:
- conveying a mobile installation system to the position, wherein the mobile installation system comprises two cranes and stowage for a plurality of rails and a plurality of poles of the DET system;
- operating each of the two cranes to lift a pole from the stowage and install the pole in an installation area, such that two poles are installed in the installation area; and
- operating the two cranes to lift one or more rail segments from the stowage and install the one or more rail segments on the two poles.

18. The method of claim 17, wherein conveying the mobile installation system comprises pulling the mobile installation system using a connected tractor.

19. The method of claim 17, wherein the mobile installation system comprises at least two platforms, and wherein the method further comprises deploying the at least two platforms from a retracted position to extend from a side of the mobile installation system over the installation area.

20. The method of claim 17, wherein the one or more rail segments are at least three rail segments that are lifted by the two cranes as a single unit.

* * * * *